United States Patent Office 3,454,576
Patented July 8, 1969

3,454,576
2-AMINOFURO [2,3-d] THIAZOLES AND PRODUCTION THEREOF
Akira Takamizawa, Ibaraki-shi, and Yoshio Hamashima, Kyogo-shi, Japan, assignors to Shionigi & Co., Ltd., Osaka, Japan
No Drawing. Filed Mar. 2, 1967, Ser. No. 619,942
Claims priority, application Japan, Mar. 3, 1966, 41/13,265
Int. Cl. C07d 99/10, 91/18; A61k 27/00
U.S. Cl. 260—256.5                                                10 Claims

ABSTRACT OF THE DISCLOSURE

A 2 - (tertiary) - amino-3-(2-methyl-4-aminopyrimidin-5-ylmethyl) - 3a - methylperhydrofuro[2,3-d]thiazole being produced by an interaction of a secondary amine with a neutralized thiamine which is given by neutralization of a thiamine salt or a thiol-type thiamine salt with a neutralization agent, and having medicinal activities including analgesic, antipyretic and vitamin $B_1$ activities.

---

This invention is concerned with 2-aminofuro[2,3-d] thiazoles. More particularly, it relates to 2-(tertiary)-amino - 3 - (2-methyl - 4-aminopyrimidin-5-ylmethyl)-3a-methylperhydrofuro[2,3-d]thiazoles. It relates further to a process for their production.

The 2-(tertiary)-amino-3-(2-methyl - 4 - aminopyrimidin - 5 - ylmethyl) - 3a - methylperhydrofuro[2,3-d]thiazoles can be illustrated by the following general formula:

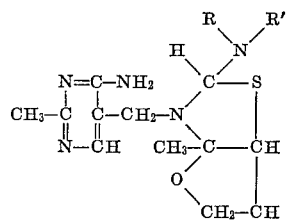

wherein R and R' are each lower alkyl (e.g. methyl, ethyl, propyl, isopropyl, butyl), lower alkenyl (e.g. allyl, butenyl, isobutenyl, pentenyl, cyclohexenyl), phenyl or phenyl-(lower)-alkyl (e.g. benzyl, phenethyl, phenylpropyl), or when taken together with the adjacent nitrogen atom, they represent a 5 to 6 membered monocyclic heterocyclic group containing, if desired, oxygen, or sulfur atom such as pyrrolidino, piperidino, morpholino or thiomorpholino group. That is, R and R' may represent together a tetramethylene, pentamethylene, oxatetramethylene, oxapentamethylene, thiatetramethylene or thiapentamethylene, chain.

Hitherto, there has never been known such a unique type compound as illustrated above. In the course of investigations on thiamine compounds, it was discovered by the present inventors that the 2 position of the thiazole ring of thiamine shows a particular activity against a secondary amine under a neutralized condition. And the inventors discovered also dtscovered that the products obtained by this new type reaction are useful as medicaments or as intermediates for the synthesis of medicaments. The present invention has founded on the bases of these discoveries.

Accordingly, an object of the present invention is to provide novel 2-aminofuro[2,3-d]thiazole derivatives. Another object of the invention is to provide 2-aminofuro-[2,3-d]thiazoles showing analgesic, antipyretic and vitamin $B_1$ activities. A further object of the invention is to provide a novel process for the production of 2-aminofuro-[2,3-d]thiazole derivatives. These and other objects and the manner in which they are accomplished will become apparent to those conversant wtih the art from the following description of the general class of compounds and certain specific examples of particular members as well as general and specific methods for their production.

According to the present invention, an objective compound 2 - (tertiary) - amino - 3 - (2-methyl-4-aminopyrimidin - 5 - ylmethyl)-3a-methylperhydrofuro[2,3-d]thiazole, can be produced by interaction of a corresponding secondary amine with a neutralized thiamine in an inert solvent at a temperature ranging from about $-100°$ C to reflux temperature of the solvent, preferably at about $-20°$ C. to a room temperature (20–30° C.).

The neutralized thiamine employed as the starting material may be prepared by neutralizing a thiamine salt (e.g. thiamine chloride hydrochloride, thiamine bromide hydrobromide, thiamine chloride hydrobromide, thiamine monochloride, thiamine mononitrate, thiamine sulfate) or a thiol-type thiamine salt (e.g. S-sodium salt of thiol-type thiamine, S-potassium salt of thiol-type thiamine, S-calcium salt of thiol-type thiamine, S-zinc salt of thiol-type thiamine). Accordingly, when a thiamine salt is taken up, the neutralization agent should be a base. Likewise, when a thiol-type thiamine salt is used, the neutralization agent should be an acid. For this neutralization, an equivalent amount of the neutralization agent should be used, because an exceeding neutralization results in the formation of another salt, i.e. the formation of a thiol-type thiamine salt from a thiamine salt or the formation of a thiamine salt from a thiol-type thiamine salt. In a similar sense, it is preferred to carry out the neutralization with a weak neutralizing agent such as carbon dioxide, an N-halogenomethylene-dimethylammonium halogenide, a trialkylamine (e.g. triethylamine, diethylpropylamine, dimethylaniline), a pyridine base (e.g. pyridine, picoline, lutidine or collidine) or the like.

The neutralized thiamine is considered to be a resonance hybrid between the yield form (A) and the carbene form (B):

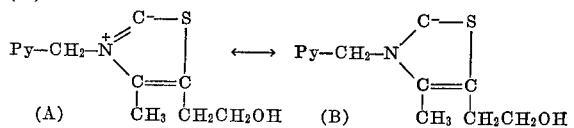

wherein Py represents 2-methyl-4-aminopyrimidin-5-yl group. As well known, the neutralized thiamine is also in the state of an equilibrium between the thiazole type and the thiol type, especially in an aqueous medium, and the thiol-type compound is not so reactive against the amine that the yield of the aminofuro[2,3-d]thiazoles is apparently decreased. Accordingly, it is also preferred to carry out the neutralization in a non-aqueous medium such as an alkanol (e.g. methanol, ethanol, propanol), a halogenoalkane (e.g. methylene chloride, chloroform, trichloroethane), a cyclic ether (e.g. tetrahydrofuran, dioxane), dimethylformamide, benzene, toluene or a mixture thereof.

The interaction of the thus prepared neutralized thiamine with a secondary amine is carried out in an inert solvent such as an alkanol (e.g. methanol, ethanol, propanol), a halogenoalkane (e.g. methylene chloride, chloroform, trichloroethane), a cyclic ether (e.g. tetrahydrofuran, dioxane), dimethylformamide, benzene, toluene or a mixture thereof. It can be executed at a wide range of temperature, i.e. from about $-100°$ C. to a reflux temperature of the solvent, but a temperature from about $-20°$ C. to about 30° C. is generally preferred.

Since the neutralized thiamine is rather unstable and its purification is liable to encounter various difficulties owing to the instability, the process of the present invention is preferably executed in the same solvent as used for the neutralization without isolation of the neutralized thiamine. That is, a desired secondary amine is added to the mixture wherein the neutralized thiamine has been prepared by the neutralization. Alternatively, the process can also be carried out by adding the neutralization agent to a mixture of a thiamine salt or a thiol-type thiamine salt and a desired amine so that the resulted neutralized thiamine can immediately react with the amine existing in the reaction medium. Generally, the aminofuro[2,3-d]thiamines are afforded as stable crystalline substances in good yield.

The amines to be used are secondary amines in the aliphatic and aromatic series. More particularly, there can be exemplified dimethylamine, diethylamine, dipropylamine, dibutylamine, diallylamine, N - methylaniline, N - benzylaniline, diphenylamine, N - cyclohexenyl - N - methylamine, N - benzyl - N - methylamine, pyrrolidine, piperidine, morpholine, thiomorpholine, and the like.

As examples of the thus produced 2-aminofuro-[2,3-d]thiazoles, there are 2-dimethylamino-3-(2-methyl-4-aminopyrimidin-5-ylmethyl)-3a-methylperhydrofuro[2,3-d]thiazole,
2-diethylamino-3-(2-methyl-4-aminopyrimidin-5-ylmethyl)-3a-methylperhydrofuro[2,3-d]thiazole,
2-dipropylamino-3-(2-methyl-4-aminopyrimidin-5-ylmethyl)-3a-methylperhydrofuro[2,3-d]-thiazole,
2-dibutylamino-3-(2-methyl-4-aminopyrimidin-5-ylmethyl)-3a-methylperhydrofuro[2,3-d]thiazole,
2-diallylamino-3-(2-methyl-4-aminopyrimidin-5-ylmethyl)-3a-methylperhydrofuro[2,3-d]-thiazole,
2-N-methylanilino)-3-(2-methyl-4-aminopyrimidin-5-ylmethyl)-3a-methylperhydrofuro[2,3-d]thiazole,
2-(N-benzyl-anilino)-3-(2-methyl-4-aminopyrimidin-5-ylmethyl)-3a-methyl-perhydrofuro[2,3-d]thiazole,
2-diphenylamino-3-(2-methyl-4-aminopyrimidin-5-ylmethyl)3a-methylperhydrofuro[2,3-d]-thiazole,
2-(N-cyclohexenyl-N-methylamino)-3-(2-methyl-4-aminopyrimidin-5-ylmethyl)-3a-methylperhydrofuro[2,3-d]thiazole,
2-(N-benzyl-N-methylamino)-3-(2-methyl-4-aminopyrimidin-5-ylmethyl)-3a-methylperhydrofuro[2,3-d]thiazole,
2-pyrrolidino-3-(2-methyl-4-aminopyrimidin-5-ylmethyl)-3a-methylperhydrofuro[2,3-d]thiazole,
2-piperidino-3-(2-methyl-4-aminopyrimidin-5-ylmethyl)-3a-methylperhydrofuro[2,3-d]thiazole,
2-morpholino-3-(2-methyl-4-aminopyrimidin-5-ylmethyl)-3a-methylperhydrofuro[2,3-d]thiazole,
2-thiomorpholino-3-(2-methyl-4-aminopyrimidin-5-ylmethyl) - 3a - methylperhydrofuro[2,3-d]thiazole, and the like.

The thus produced 2-aminofuro[2,3-d]thiazoles show analgesic, antipyretic and vitamin $B_1$ activities and are useful as medicants. The median effective dose value ($ED_{50}$) of the analgesic activity of 2-morpholino-3-(2-methyl-4-aminopyrimidin-5-ylmethyl) - 3a - methylperhydrofuro[2,3-d]-thiazole, for instance, is 177 mg./kg. when tested according to the stretching method (wherein the activity is determined by inhibition of the stretching caused by 2-phenyl-1,4-benzoquinone) in mice by subcutaneous administration and 373 mg./kg. when tested according to the modified Haffner method in mice by subcutaneous administration. Furthermore, the median lethal dose value ($LD_{50}$) is determined to be 600 mg./kg. in mice subcutaneously. The other compounds produced by the process of the invention show similar activities and are useful as medicaments. They can be administered in a variety of per se conventional ways, e.g. in the form of tablets constituted e.g. by an effective single dose of active compound of the invention and a major proportion of a per se conventional carrier.

The following examples illustrate methods of carrying out the present invention but it is to be understood that these examples are given for purpose of illustration only and not of limitation. In the examples which follow, parts by weight bear the same relation to parts by volume as do grams to millilitres. The temperatures are set forth in degree centigrade. The abbreviations have conventional significances.

Example 1

Into a solution of crude S-sodium salt of thiol-type thiamine (4.25 parts by weight) and morpholine (3.4 parts by weight) in ethanol or a mixture of ethanol-toluene (40 parts by volume) is passed an excess of carbon dioxide with stirring at 0–5° C. After removal of the solvent, the residue is extracted with chloroform. The extract is washed with water, dried over anhydrous sodium sulfate and evaporated. The residue is recrystallized from acetone to give 2 - morpholino - 3 - (2-methyl-4-aminopyrimidin - 5-ylmethyl)-3a-methylperhydrofuro[2,3-d]thiazole (2.92 parts by weight) as colorless needles, melting at 143 to 144° C. with decomposition.

Analysis.—Calcd. for $C_{16}H_{25}N_5O_2S$: C, 54.67; H, 7.17; N, 19.92. Found: C, 54.87; H, 7.35; N, 19.41.

IR $\nu_{max.}^{Nujol}$ cm.$^{-1}$: 3342, 3146, 1676, 1597, 1577, 1113

NMR (CDCl$_3$) $\tau$:1.98 (singlet), 3.72 (broad), 4.95 (singlet), 6.10 (singlet), 6.35 (multiplet), 7.55 (singlet), 7.65 (multiplet), 8.42 (singlet), 5.62–6.0 (multiplet), 6.5–6.78 (multiplet), 7.72–8.0 (multiplet).

Example 2

Into a suspension of crude S-sodium salt of thiol-type thiamine (4.25 parts by weight) in toluene (30 parts by volume) is passed an excess of carbon dioxide under cooling with a Dry Ice-acetone bath. Then, the temperature is gradually elevated to a room temperature and the mixture is stirred at the same temperature for 2 hours. Afte removal of the solvent, the residue is added with a solution of morpholine (5 parts by volume) in ethanol (20 parts by volume) and the mixture is stirred at a room temperature for 2 hours. The solvent is removed under reduced pressure and the residue is extracted with chloroform. The extract is washed with water, dried over anhydrous sodium sulfate, and evaporated. The residue is recrystallized from acetone to give 2-morpholino-3-(2-methyl-4-aminopyrimidin-5 - ylmethyl) - 3a - methylperhydrofuro[2,3-d]thiazole (2.5 parts by weight) as colorless needles, melting at 143 to 144° C. with decomposition.

Example 3

To a suspension of thiamine chloride hydrochloride (3.37 parts by weight) in dimethylformamide (20 parts by volume) is added triethylamine (4.05 parts by weight) under ice-cooling. The resulting paste-like mixture is stirred for 15 minutes, and subsequently morpholine (1.8 parts by weight) is added. The mixture is stirred at a room temperature for 20 hours and the precipitated triethylamine hydrochloride is removed by filtration. The filtrate is evaporated under reduced pressure and the residue is dissolved in chloroform. The insoluble thiamine chloride is removed by filtration, the filtration is washed with water, dried over anhydrous sodium sulfate and evaporated. The residue is recrystallized from acetone to give 2 - morpholino - 3 - (2-methyl-4-aminopyrimidin-5-ylmethyl)-3a-methylperhydrofuro[2,3-d]thiazole (1.5 parts by weight) as colorless needles, melting at 143 to 144° C. with decomposition.

Example 4

To a suspension of S-sodium salt of thiol-type thiamine (4.5 parts by weight) in benzene (40 parts by volume) is added N-chloromethylene-dimethylammonium chloride (0.64 part by weight) with stirring at 10° C., and the mixture is stirred at a room temperature for 2 hours, whereby the pH value of the reaction mixture decreased to about 8. Then, morpholine (3.4 parts by weight) is added, the mixture is stirred for further 1 hour, and allowed to stand at a room temperature overnight. After removal of the solvent, the residue is extracted with chloroform. The extract is washed with water, dried over anhydrous sodium sulfate and evaporated. The residue is recrystallized from acetone to give 2-morpholino- 3 - (2 - methyl-4-aminopyrimidin-5-ylmethyl)-3a-methyl-perhydrofuro[2,3-d]thiazole (1.8 parts by weight), melting at 143 to 144° C. with decomposition.

Example 5

To a suspension of S-sodium salt of thiol-type thiamine (4.5 parts by weight) in chloroform (40 parts by volume) is added N-chloromethylene-dimethylammonium chloride (0.64 part by weight) under ice-cooling, and the mixture is stirred at the same temperature for 30 minutes. Then, morpholine (3.4 parts by weight) is added, the mixture is stirred for further 2 hours at a room temperature, and allowed to stand at the same temperature overnight. The reaction mixture is washed with water, dried over anhydrous sodium sulfate and evaporated. The residue is recrystallized from acetone to give 2-morpholino - 3 - (2 - methyl-4-aminopyrimidin-5-ylmethyl)-3a-methylperhydrofuro[2,3-d]thiazole (2.0 parts by weight), melting at 143 to 144° C. with decomposition.

Example 6

To a solution of crude S-sodium salt of thiol-type thiamine (4.25 parts by weight) is added piperidine (3.4 parts by volume) under ice-cooling, and an excess of carbon dioxide is passed into the solution at the same temperature. The mixture is allowed to stand for 1 hour at the same temperature and for 2 days at a room temperature. After removal of the solvent, the residue is extracted with chloroform. The extract is washed with water, dried over anhydrous sodium sulfate and evaporated. The residue is recrystallized from acetone to give 2-piperidino - 3 - (2 - methyl-4-aminopyrimidin-5-ylmethyl)-3a-methylperhydrofuro[2,3-d]thiazole as colorless pillars, melting at 145 to 147° C. with decomposition.

Analysis.—Calcd. for $C_{17}H_{27}N_5OS$: C, 58.42; H, 7.79; N, 20.04. Found: C, 58.63; H, 8.08; N, 20.15.

IR $\nu_{max.}^{Nujol}$ cm.$^{-1}$: 3360, 3056, 1672, 1604, 1596, 1090, 1032, 985

UV $\lambda_{max.}^{EtOH}$ m$\mu$ ($\epsilon$): 238.5 (8400), 280.5 (5930)

Example 7

To a solution of crude S-sodium salt of thiol-type thiamine (4.25 parts by weight) is added dimethylamine (3.0 parts by weight) under ice-cooling, and an excess of carbon dioxide is passed into the solution at the same temperature. The mixture is allowed to stand for 2 hours at the same temperature and for 24 hours at a room temperature. After removal of the solvent, the residue is extracted with chloroform. The extract is washed with water, dried over anhydrous sodium sulfate and evaporated. The residue is recrystallized from acetone to give 2-dimethylamino - 3 - (2-methyl-4-aminopyrimidin-5-ylmethyl)-3a-methylperhydrofuro[2,3-d]thiazole.

Example 8

To a solution of crude S-sodium salt of thiol-type thiamine (4.25 parts by weight) is added diethylamine (3.0 parts by weight) under ice-cooling, and an excess of carbon dioxide is passed in the solution at the same temperature. The mixture is allowed to stand for 3 hours at the same temperature and for 16 hours at a room temperature. After removal of the solvent, the residue is extracted with chloroform. The extract is washed with water, dried over anhydrous sodium sulfate and evaporated. The residue is recrystallized from acetone to give 2-diethylamino-3-(2-methyl - 4 - aminopyrimidin - 5 - methyl)-3a-methylperhydrofuro[2,3-d]thiazole.

Example 9

To a solution of crude S-sodium salt of thiol-type thiamine (4.25 parts by weight) is added dibutylamine (3.5 parts by weight) under ice-cooling, and an excess of carbon dioxide is passed into the solution at the same temperature. The mixture is allowed to stand at room temperature overnight. After removal of the solvent, the residue is extracted with chloroform. The extract is washed with water, dried over anhydrous sodium sulfate and evaporated. The residue is recrystallized from acetone to give 2-dibutylamino-3-(2 - methyl - 4 - aminopyrimidin-5-ylmethyl)-3a-methylperhydrofuro[2,3-d]thiazole.

Example 10

To a solution of crude S-sodium salt of thiol-type thiamine (4.0 parts by weight) is added N-methyl-N-benzylamine (3.5 parts by weight) under ice-cooling, and an excess of carbon dioxide is passed into the solution at the same temperature. The mixture is allowed to stand at a room temperature overnight. After removal of the solvent, the residue is extracted with chloroform. The extract is washed with water, dried over anhydrous sodium sulfate and evaporated. The residue is recrystallized from acetone to give 2-(N-methyl-N-benzylamino) - 3 - (2-methyl-4-aminopyrimidin-5-ylmethyl) - 3a - methylperhydrofuro-[2,3-d]thiazole.

What is claimed is:

1. A compound of the formula:

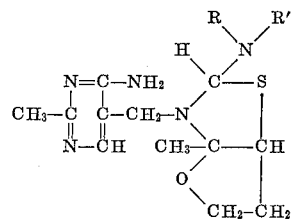

wherein R and R' each is a member selected from the group consisting of lower alkyl, lower alkenyl, phenyl and phenyl-(lower)-alkyl and R and R' together with the adjacent nitrogen atom represent a member selected from the group consisting of pyrrolidino, piperidino, morpholino and thiomorpholino.

2. A compound according to claim 1, namely, 2-di-(lower)-alkylamino-3-(2-methyl - 4 - aminopyrimidin-5-ylmethyl)-3a-methylperhydrofuro[2,3-d]thiazole.

3. A compound according to claim 1, namely, 2-(N-(lower)-alkyl-N-phenyl-(lower) - alkylamino)-3-(2-methyl-4-aminopyrimidin-5-ylmethyl) - 3a - methyl-perhydrofuro[2,3-d]thiazole.

4. A compound according to claim 1, namely 2-(six-membered)-cyclic amino-3-(2-methyl-4-aminopyrimidin-5-ylmethyl) - 3a - methylperhydrofuro[2,3 - d]thiazole, wherein the (six-membered) - cyclic amino group is a member selected from the group consisting of piperidino, morpholino and thiomorpholino.

5. A compound according to claim 1, namely, 2-dimethylamino-3-(2-methyl - 4 - aminopyrimidin-5-ylmethyl)-3a-methylperhydrofuro[2,3-d]thiazole.

6. A compound according to claim 1, namely, 2-diethylamino-3-(2 - methyl-4-aminopyrimidin-5-ylmethyl)-3a-methylperhydrofuro[2,3-d]thiazole.

7. A compound according to claim 1, namely, 2-dibutylamino-3-(2 - methyl-4-aminopyrimidin-5-ylmethyl)-3a-methylperhydrofuro[2,3-d]thiazole.

8. A compound according to claim 1, namely, 2-(N-methyl-N-benzylamino)-3-(2 - methyl-4-aminopyrimidin-5-ylmethyl)-3a-methylperhydrofuro[2,3-d]thiazole.

9. A compound according to claim 1, namely, 2-piperidino-3-(2-methyl - 4 - aminopyrimidin - 5 - ylmethyl)-3a-methylperhydrofuro[2,3-d]thiazole.

10. A compound according to claim 1, namely, 2-morpholino-3-(2 - methyl-4-aminopyrimidin - 5 - ylmethyl-3a-methyl-perhydrofuro[2,3-d]thiazole.

References Cited

Japanese patent, Chem. Abstracts, vol. 52, col. 11950, 1957.

NICHOLAS S. RIZZO, *Primary Examiner.*

R. J. GALLAGHER, *Assistant Examiner.*

U.S. Cl. X.R.

260—243, 247, 999